United States Patent [19]

Bhagavatula

[11] Patent Number: 4,877,304

[45] Date of Patent: Oct. 31, 1989

[54] FEW-MODE/SINGLE-MODE FIBER

[75] Inventor: Venkata A. Bhagavatula, Big Flats, N.Y.

[73] Assignee: Corning Incorporated, Corning, N.Y.

[21] Appl. No.: 197,594

[22] Filed: May 23, 1988

Related U.S. Application Data

[63] Continuation-in-part of Ser. No. 94,504, Sep. 9, 1987, abandoned.

[51] Int. Cl.$^4$ .............................. G02B 6/02; G02B 6/16
[52] U.S. Cl. .............................. 350/96.29; 350/96.30; 350/96.31
[58] Field of Search ................ 350/96.29, 96.30, 96.31

[56] References Cited

U.S. PATENT DOCUMENTS 4,204,745 5/1980 Sakai et al. ..................... 350/96.31
4,465,334 8/1984 Siemsen et al. .................. 350/96.30

*Primary Examiner*—William L. Sikes
*Assistant Examiner*—Robert E. Wise
*Attorney, Agent, or Firm*—William J. Simmons, Jr.

[57] ABSTRACT

The present invention pertains to an optical fiber comprising a transparent core having a maximum refractive index $n_1$ and a radius a surrounded by a layer of transparent cladding material having a refractive index $n_0$ which is less than $n_1$. The refractive indices $n_1$ and $n_0$, the radius a, and the refractive index profile of the core are designed such that:

(a) $\Delta\tau_j$, the difference between $|d(Vb)/dV|_j$, the normalized delay time of the jth mode and $|d(Vb)/dV|_0$, the normalized delay time of the fundamental mode, is less than about $5 \times 10^{-2}$ over a wide range of V-values where j is equal to 1 or 2 and represents the highest order mode that propagates with a low loss, 0 represents the fundamental mode, b is the propagation constant and V is the normalized frequency, and (b) the normalized waveguide dispersion $Vd^2(Vb)/dV^2$ is about equal to or less than 0.2 at V-values near $V^1_c$, the normalized cutoff frequency of the first higher order mode. A fiber exhibiting characteristics (a) and (b) is capable of providing mode equalized two-mode or three-mode and low dispersion single-mode operation.

45 Claims, 2 Drawing Sheets

FEW-MODE/SINGLE-MODE FIBER

CROSS-REFERENCE TO RELATED APPLICATION

This application is a continuation-in-part of application Ser. No. 094,504 filed Sept. 9, 1987 now abandoned.

BACKGROUND OF THE INVENTION

1. Definitions

Following are art recognized terms which are used herein to describe physical characteristics and propagation characteristics of optical fibers. These terms are well known in the art and can be found in such texts and publications as *Optical Fiber Telecommunications*, edited by S. E. Miller et al., Academic Press, 1979 (especially Chapter 3); *Optical Fibers for Transmission* by J. E. Midwinter, John Wiley & Sons, 1979 (especially Chapters 5 and 6); *Theory of Dielectric Waveguides* by D. Marcuse, Academic Press, 1974; and my U.S. Pat. No. 4,715,679.

The present invention relates to optical fibers for communication purposes wherein the relative refractive index difference $\Delta$ is much less than 1, the term $\Delta$ being defined as $$\Delta = \frac{n_1^2 - n_0^2}{2n_1^2} \approx \frac{n_1 - n_0}{n_1} \tag{1}$$

Fibers having such small values of $\Delta$ are called weakly guiding fibers; the propagation constants of their guided modes are represented by $\beta$ such that $$n_0 k < \beta < n_1 k \tag{2}$$

where $n_1$ is the peak refractive index of the core, $n_0$ is the cladding index and k, the propagation constant of plane waves in vacuum, is equal to $2\pi/\lambda$, $\lambda$ being the wavelength.

The normalized frequency V is a dimensionless number that determines the number of modes a fiber can support; it can be defined as follows:

$$V = (n_1^2 - n_0^2)^{\frac{1}{2}} ka \tag{3}$$

where a is the core radius. The term $V_c^j$ is the normalized cutoff frequency of the jth mode, the term $V_c^1$ being the normalized cutoff frequency of the first higher order mode. The operating V-value is $V_o$.

A more convenient way of representing the propagation constant is by the normalized propagation constant b, which is defined as $$b = \frac{(\beta/k)^2 - n_0^2}{n_1^2 - n_0^2} \tag{4}$$

The normalized propagation constant b depends on the refractive index profile of the fiber and the normalized frequency V. An example of such behavior is shown for step index fibers in FIG. 3.3 of the publication *Optical Fiber Telecommunications*. In general, for more complicated refractive index profiles, such propagation curves of b vs. V are obtained by numerical calculations by computer modeling.

When more than one mode propagates in an optical fiber, the difference in delay times of the fastest and slowest propagating modes limits the bandwidth of the fiber. The normalized delay time of the jth mode is given by $|d(Vb)/dV_j|_j$, where j represents the highest order mode that propagates with low loss and 0 represents the fundamental mode. The difference between the normalized delay times of the fundamental mode and the jth mode can be characterized by $$\Delta \tau_j = \left| \frac{d(Vb)}{dV} \right|_j - \left| \frac{d(Vb)}{dV} \right|_0 \tag{5}$$

In single-mode waveguides the total dispersion is governed by the material dispersion $D_m$ and the waveguide dispersion $D_w$. For a given fiber composition, the material dispersion varies as a function of wavelength. For example, the material dispersion versus wavelength curve passes through zero dispersion at a wavelength near 1280 nm for high silica content fibers. Single mode fibers can be designed which exhibit zero total dispersion at any wavelength in a range of wavelengths above that wavelength at which the material dispersion curve passes through zero dispersion. This can be achieved by balancing out material dispersion with waveguide dispersion at some specified wavelength which is selected because of low fiber attenuation and/or availability of light sources. A convenient quantity for analyzing the waveguide dispersion is $Vd^2(Vb)/dV^2$, the normalized waveguide dispersion, which is related to waveguide dispersion $D_w$ as follows:

$$D_w \approx \frac{-n_0 \Delta}{c} \left| \frac{V d^2(Vb)}{dV^2} \right| \tag{6}$$

where c is the speed of light. A graph of normalized waveguide dispersion versus the ratio $(V/V_c^1)$ enables one to compare the relative waveguide dispersions that can be obtained for different fiber core refractive index profiles.

2. Field of the Invention

The present invention relates to optical fibers for use in communication systems, and more particularly, to optical fibers that are characterized by high bandwidth, few mode operation at a predetermined band of wavelengths and by low dispersion, single-mode operation at longer wavelengths.

Multimode fibers are advantageous for certain applications such as local area networks since inexpensive connectors and sources can be employed. However, the bandwidth of a conventional multimode fiber is relatively low since the group delays of modes are different. A solution to this dilemma involves the utilization of a fiber that is designed such that only a few modes propagate, the normalized delay times of the propagating modes coinciding at or near the operating V-value $V_o$. Also, the difference between the normalized delay times of the propagating modes caused by V-value deviation from $V_o$ should be as small as possible. Some few-mode fibers are designed to operate at a V-value where the j+1 mode is lossy. If the cutoff value of the j+1 mode is $V_c^{j+1}$, the fiber may operate at a V-value $V_o$ that is up to about 1.1 $V_c^{j+1}$. Thus, only the normalized delay times of the low loss propagating modes up to the jth mode are taken into consideration. As will be discussed below, this lossy j+1 mode is potentially troublesome. Since few-mode fibers have both relatively large information carrying capacities relative to conventional multimode fibers and have relatively large core diameters, as compared to single-mode fibers, they have been considered for use in local area networks.

A few-mode optical fiber would be especially advantageous if it were also capable of low dispersion single-mode operation. As used herein, the term "low dispersion" means a total dispersion of less than 5 ps/km-nm. Such a fiber would be useful in a number of systems applications. For example, a system could be operated at a first wavelength at which the fiber propagates a few modes in order to take advantage of inexpensive sources and connectors when bandwidth requirements are relatively low to moderate, i.e. greater than 1 GHz-km and preferably in the range of 2–4 GHz-km. Later, when bandwidth requirements increase, the system can be upgraded by employing terminal equipment which operates at a higher bit rate and by utilizing a source and detector that operate in the low dispersion, single-mode region of the fiber.

A few-mode/single-mode fiber would also be useful in a system in which data must be transmitted at a relatively high data rate in one direction but wherein relatively low to moderate data rate propagation is permissible in the opposite direction. A high performance laser might be employed to initiate the propagation of the high data rate signal at one end of the fiber. A less expensive source, operating at a shorter wavelength, could be employed to initiate the propagation of the few mode signal.

3. The Prior Art (a) Two-Mode Optical Fibers

U.S. Pat. No. 4,204,745 (Sakai et al) discloses a graded index two-mode fiber wherein the refractive index profile is given by $$n(r) = \begin{cases} n_1[1 - 2\Delta (r/a)^\alpha]^{1/2} & 0 \leq r \leq a \\ n_0 = n_1[1 - 2\Delta]^{1/2} & r > a \end{cases} \quad (7)$$

where $n_1$ denotes the peak refractive index of the core, $n_0$ denotes the refractive index of the cladding, $\Delta$ is the aforementioned relative index difference, a is the core radius, and $\alpha$ is the index profile parameter. The fiber is designed such that the normalized frequency V is as large as possible, so long as V is less than the cut-off frequency of the second higher order mode ($LP_{21}$). Thus, the fundamental mode ($LP_{01}$) and the first higher order mode ($LP_{11}$) are propagated simultaneously. The refractive index distribution of the core is designed such that the group delay of the lowest order ($LP_{01}$) mode coincides with that of the first higher order ($LP_{11}$) mode, the power exponent $\alpha$ preferably satisfying the inequality $$3.2 \leq \alpha \leq 6$$

Although fibers of the type disclosed in the Sakai et al. patent are capable of propagating two modes with low dispersion over a band of wavelengths, the low dispersion wavelength band is relatively narrow.

The wavelength band of good mode equalization can be broadened by reducing $\alpha$ to a value below 3.2; however, this cannot be done without adversely affecting single-mode operation. Fibers having $\alpha$-values less than 3.2 have been proposed in the publication, K. Kitayama et al., IEEE Journal of Quantum Electronics, vol. QE-17, No. 6, June 1981, pp 1057-1063 wherein optimal $\alpha$ for 2-mode propagation was determined to be 2.24 and in the publication, L. G. Cohen et al., Bell System Technical Journal, vol. 59, No. 6, July-August 1980, pp. 1061-1072 wherein optimal $\alpha$ for two-mode propagation was determined to be 2.5. When the $\alpha$-value of a fiber is in the range defined by the Kitayama et al. and Cohen et al. publications, operation is substantially above the theoretical cutoff of the second higher order mode. If the second higher order mode is not totally eliminated, the system bandwidth will be degraded. This is especially troublesome in subscriber loop applications wherein relatively short lengths of fiber may connect the transmitter and receiver and wherein short lengths of fiber may extend between connectors. The second higher order mode can be re-excited at each connector. Also, if such a fiber is optimized for two mode operation, it will not exhibit low waveguide dispersion in the preferred range of single-mode operation near the normalized cutoff frequency of the first higher order mode.

A different approach to two-mode fiber design is described in the publication, M. M. Cvijetic et al., IEEE Journal of Quantum Electronics, vol. QE-23, No. 5, May 1987, pp 469-472 which describes a non $\alpha$-profile fiber design for obtaining dispersion-free two-mode operation at 1.55 $\mu$m. Two-mode operation at 1.3 $\mu$m is described in the publication, M. M. Cvijetic, Optical and Quantum Electronics, vol. 16, 1984, pp 307-317. In accordance with the technique described in these publications, an attempt is made to minimize chromatic dispersion in the two-mode region of operation (either 1.55 $\mu$m or 1.3 $\mu$m). There is no attempt made in these publications to optimize dispersion properties of the fundamental mode in the single-mode region of operation. If an attempt were made to operate either of the two fibers of the Cvijetic publications in the single-mode region near the cutoff V-value of the first higher order mode, waveguide dispersion would be so high that information carrying capacity of the fiber would be limited.

(b) Simultaneous Single-Mode/Multimode Transmission

An optical fiber that is designed to simultaneously propagate single-mode and multimode signals is taught in U.S. Pat. 4,465,334. The core of that fiber comprises two concentric light conducting zones. The inner, single-mode zone has a stepped refractive index profile, and its cladding is the adjacent portion of the outer light conducting zone. The outer zone has a graded refractive index profile, and its diameter is much larger than that of the inner zone, whereby it propagates a multimode signal. If an attempt were made to excite only the single-mode signal by confining the source light to the central zone, a significant percentage of the input power would propagate in the outer, multimode part of the fiber at a different speed than the single-mode signal propagating in the central zone. Similarly, an attempt to initiate the propagation of only a multimode signal would result in the transmission of a single-mode signal in the central zone. In either case, bandwidth would be adversely affected. A fiber of the type taught in U.S. Pat. No. 4,465,334 would therefore not be capable of bidirectional, high bandwidth transmission in a practical system.

Conventional, commercially available silica-based single-mode optical fibers that are designed for operation at wavelengths beyond 1250 nm are capable of propagating two or more modes in the wavelength region between about 800 nm and 900 nm. However, such fibers exhibit a bandwidth less than 1 GHz-km (usually about 200–400 MHz-km) when operated in that few mode region.

SUMMARY OF THE INVENTION

It is therefore an object of the present invention to provide an optical fiber that is capable of propagating two or three modes with low dispersion over a wide band of wavelengths and which is also capable of low dispersion operation in the single-mode region near the cutoff V-value of the first higher mode.

Briefly, the fiber of the present invention comprises a core of transparent material having a maximum refractive index $n_1$ and a radius a. On the outer surface of the core is a layer of transparent cladding material having a refractive index $n_0$ which is less than $n_1$. The fiber is characterized in that the refractive indices $n_1$ and $n_0$, the radius a, and the refractive index profile of the core are designed such that the following conditions are present.

(a) $\Delta\tau_j$, the difference between $|d(Vb)/dV|_j$, the normalized delay time of the jth mode and $|d(Vb)/dV|_0$, the normalized delay time of the fundamental mode, is less than about $5\times 10^{-2}$ over a wide range of V-values where j is equal to 1 or 2 and represents the highest order mode that propagates with a low loss, 0 represents the fundamental mode, b is the propagation constant and V is the normalized frequency, and (b) the normalized waveguide dispersion $Vd^2(Vb)/dV^2$ is about equal to or less than 0.2 at V-values near $V_c^1$, the normalized cutoff frequency of the first higher order mode. It is preferred that $\Delta\tau_j$ is less than about $5\times 10^{-2}$ over a range of V-values equal to about 10% of V near $V_c^{j+1}$, where $V_c^{j+1}$ is the normalized cutoff frequency of the j+1 mode.

A fiber having a core refractive index profile designed in accordance with the present invention is capable of propagating: (a) a signal having two or more modes in the wavelength range between about 800 and 900 nanometers with a bandwidth greater than 1 GHz, and (b) a low dispersion single-mode signal at a wavelength greater than 1250 nanometers.

DETAILED DESCRIPTION

Figure 1:
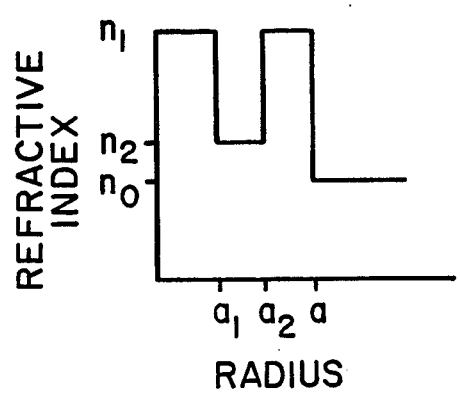
FIG. 1 is a refractive index profile of an optical fiber that meets the requirements of the present invention.

Optical fibers designed for use in local area networks and subscriber loops should exhibit easy splicing capability and should be compatible with inexpensive light sources. Because of the small core diameter of single-mode fibers, they fail to satisfy either of these requirements. The larger core diameters of the two-mode fibers described in the section entitled "The Prior Art" meet the splicing and source requirements set forth above. However, systems utilizing those prior art fibers do not have the capability of being upgraded at some future time when system architecture or system information carrying capacity requires low dispersion single-mode operation.

It has been determined that an optical fiber will exhibit mode equalized few-mode operation and will also be capable of providing low dispersion single-mode operation at V-values near $V_c^1$, the normalized cutoff frequency of the first higher order mode, if the following conditions are met:

(a) The normalized propagation velocity of the fundamental mode and the jth mode must be sufficiently close over a wide range of operating wavelengths. The difference in the normalized delay times, $\Delta\tau_j$, between the fundamental mode and the jth mode must be less than about $5\times 10^{-2}$ over a wide range of V-values where j is at least 1 and is preferably 1 or 2. In a preferred embodiment, the range of V-values over which $\Delta\tau_j$ is less than about $5\times 10^{-2}$ is approximately 10% V near V where $V_c^{j+1}$ where $V_c^{j+1}$ represents the normalized cutoff frequency of the (j+1) mode. The multimode bandwidth of such a fiber can exceed 1 GHz-km, fibers designed in accordance with this invention exhibiting a multimode bandwidth of more than 2 GHz-km. The refractive index profile of the present invention ensures good multimode operation; such multimode operation cannot be obtained by fibers defined by equation (7) wherein $\alpha$ is greater than about 3.

(b) The normalized waveguide dispersion $Vd^2(Vb)/dV^2$ is about equal to or is less than 0.2 at V-values near $V_c^1$. This requirement ensures low total dispersion, i.e. less than 5 ps/km-nm, in the single-mode region near $V_c^1$, and it cannot be satisfied by fibers of the type defined by equation (1) wherein $\alpha$ is less than 3. It also eliminates those fibers of the type disclosed in the aforementioned Cvijetic et al. publication wherein optimization of dispersion properties in the 2-mode region preclude the attainment of low waveguide dispersion in the single-mode region near the first higher order order mode cutoff.

Fibers designed in accordance with the present invention will generally propagate only one low-loss higher order mode. However, since fibers can be designed to provide mode equalized three mode operation wherein the second higher order mode is also characterized by low loss propagation, the term "few mode propagation" refers to the low loss propagation of the fundamental mode and at least one higher order order mode. The highest order mode that propagates with low loss is designated the jth-mode.

Because of the limited number of variables available in the design of a step-index or a simple α-profile fiber, it is not expected that such a fiber could meet both of the aforementioned conditions (a) and (b). Examples of fibers having a greater number of variables are segmented core fibers and W-type fibers. Examples of segmented core fibers are disclosed in my U.S. Pat. No. 4,715,679. The term "W-type fibers" as used herein means those fibers in which the central core region is surrounded by an index depression of sufficiently narrow width that a significant amount of power propagates beyond the depression at certain operating wavelengths.

An example of a segmented core refractive index profile having many design variables is shown in FIG. 1, wherein the core radius a, the inner and outer index depression radii $a_1$ and $a_2$, the core index values $n_1$ and $n_2$ and the cladding index $n_0$ can all be varied to manipulate the two-mode and singlemode properties of the fiber. The profile of FIG. 1 is generally similar to one of the profiles disclosed in my aforementioned U.S. Pat. No. 4,715,679; however, the present invention involves the optimization of fiber parameters for operation in both the single-mode and the few-moded regions of the fiber.

Figure 2:
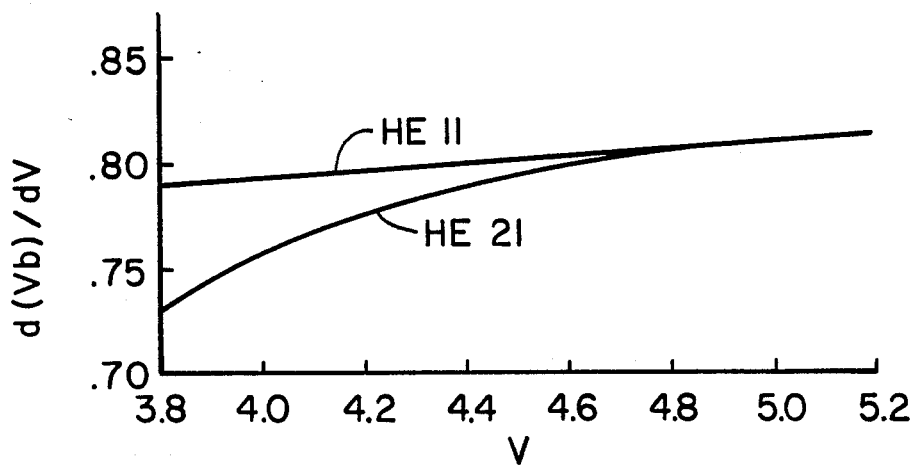
FIGS. 2 and 3 are graphs of d(Vb)/dV, the normalized pulse arrival time plotted as a function of V-values for two different fibers.
Figure 3:
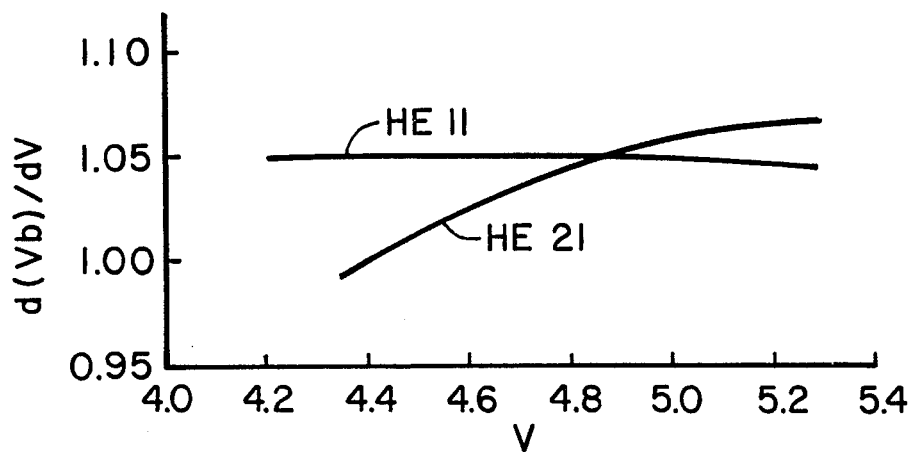

Specific values for the above-mentioned variables of FIG. 1 are obtained by an iterative process. One variable is changed in a given direction, and the mode equalization and single-mode dispersion characteristics are calculated. The variable is repeatedly changed in a direction such that these operating characteristics are improved. Then other variables are similarly varied to improve operating characteristics. The results of one such iterative process are as follows, reference being made to FIG. 1. The fiber radius a was determined to be about 5 $\mu$m while radii $a_1$ and $a_2$ were determined to be about 1.9 $\mu$m and about 3.5 $\mu$m, respectively. The relative refractive index difference $\Delta_1$, which is equal to $(n_1{}^2 - n_0{}^2)/2n_2{}^1$, was determined to be 0.45%, and $\Delta_2$, which is equal to $(n_2{}^2 - n_0{}^2)/2n_1{}^2$, was determined to be 0.12%. FIG. 2 is a plot of d(Vb)/dV, the calculated normalized pulse arrival time, for the lowest order mode and the first higher order mode which propagate in the fiber described. For comparison purposes, FIG. 3 shows a similar graph for a fiber of the type characterized by equation (1) wherein the $\alpha$ value is 3. As compared with the curves of FIG. 3, the curves of FIG. 2 demonstrate a smaller change in the normalized pulse arrival times for the two propagating modes per unit change in V-value.

Figure 4:
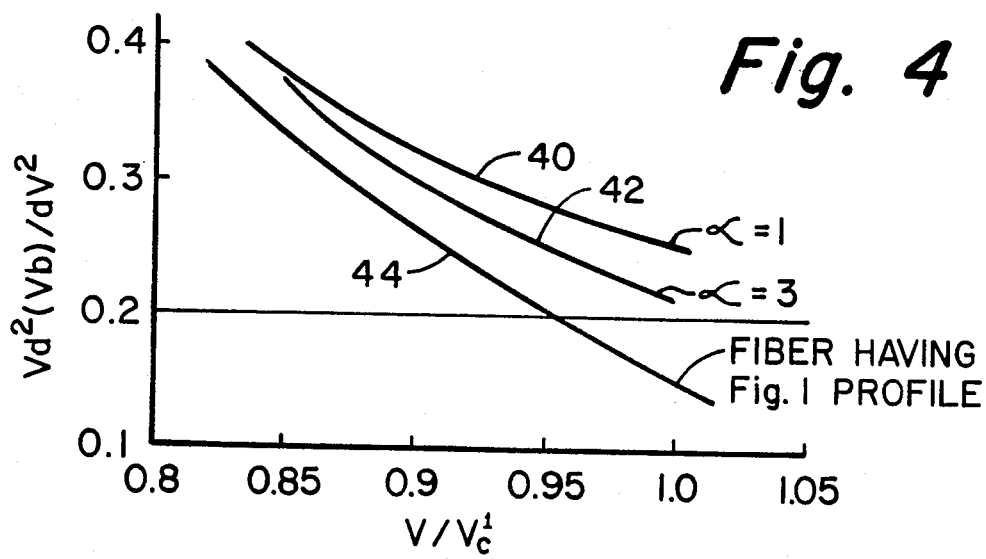
FIG. 4 is a graph of normalized waveguide dispersion plotted as a function of $V/V_c^1$.

The calculated single-mode propagating characteristics of the fibers characterized by the curves of FIGS. 2 and 3 are illustrated in FIG. 4 wherein the normalized waveguide dispersion $Vd^2(Vb)/dV^2$ is plotted as a function of the ratio $V/V_c{}^1$. The graph of FIG. 4 enables one to compare the relative waveguide dispersions that can be obtained for the three different fiber core refractive index profiles. Curve 44 has normalized dispersion of less than 0.2 at a value of $V/V_c{}^1$ close to but less than 1. This is indicative of the fact that a fiber having such characteristics could be advantageously operated at a wavelength which is at or just above the zero material dispersion wavelength, said operating wavelength being near the single-mode cutoff wavelength.

As heretofore noted, the difference in the calculated normalized pulse arrival times of the two modes characterized by FIG. 2 changes less with a change in V-value than the corresponding change of the $\alpha=3$ fiber characterized by FIG. 3. It was also mentioned above that the change in normalized pulse arrival time with respect to $\Delta V$ for an $\alpha$-profile fiber could be minimized by employing an $\Delta$-value smaller than 3. However, as shown in FIG. 4, the value of $Vd^2 (Vb)/dV^2$ versus $V/V_c{}^1$ at $V=V_c{}^1$ increases as $\alpha$ decreases to values below 3. It is thus seen that, unlike the optical fiber of the present invention, simple $\alpha$-profile fibers characterized by equation (7) cannot simultaneously provide mode equalized two mode and low dispersion single-mode operation.

Figure 5:
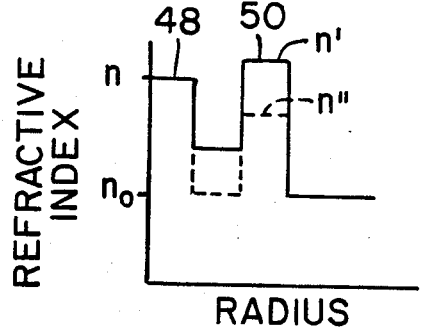
FIGS. 5, 6, 7, 8, 9, and 10 show other refractive index profiles that meet the requirements of the present invention.
Figure 6:
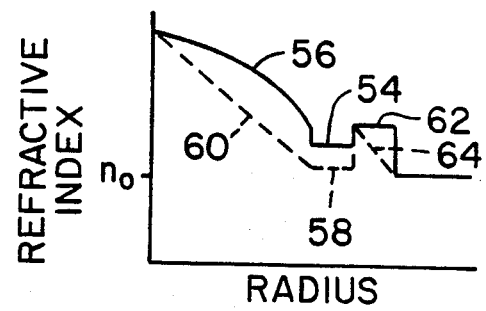

Fibers having core refractive index profiles of the types shown in FIGS. 5 through 11 should also be capable of satisfying the above-defined conditions (a) and (b) and thus provide both mode equalized few-mode propagation and low dispersion single-mode operation. In the refractive index profiles of FIGS. 5 and 6 the refractive indices of the core regions are limited to values that are equal to or greater than that of the cladding. In the profile of FIG. 5, the refractive index of inner core region 48 is $n_1$. Unlike the profile of FIG. 1, the refractive index of outer core region 50 can be $n_1'$ which is greater than $n_1$, or $n_1''$ which is less than $n_1$. FIG. 6 shows that the refractive index profiles of one or more of the core regions can be graded. The refractive index of depression 54 is lower than the lowest value of refractive index of inner core region 56. Dashed lines 58 and 60 indicate that the refractive index of depressed index region 58 can be the same as the lowest value of refractive index of inner region 60. The refractive index of the outer core region can be constant as indicated by line 62 or radially graded as indicated by line 64.

Figure 7:
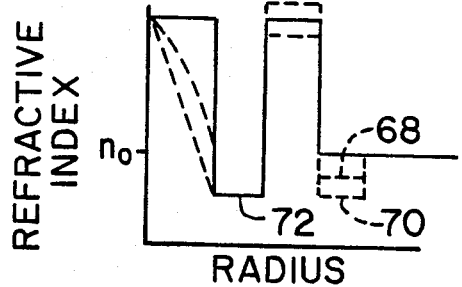

FIG. 7 shows that certain design variables can take on additional values by permitting the refractive index of one or more of the core regions to be lower than that of the cladding. This can be achieved, for example, by employing $SiO_2$ as the outer cladding material and F-doped or $B_2O_3$-doped $SiO_2$ as the low index core regions. Dashed lines 68 and 70 indicate that one or more additional core segments can be employed.

Figure 8:
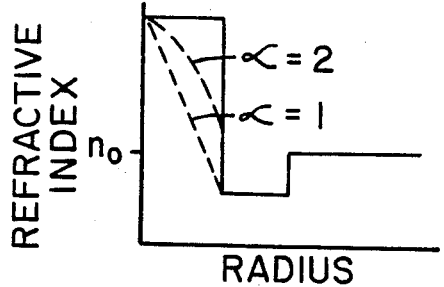
Figure 9:
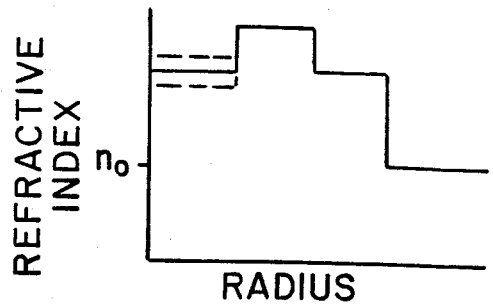
Figure 10:
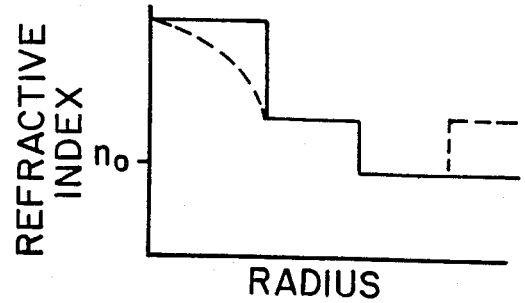

Other suitable profiles are shown in FIGS. 8, 9 and 10, wherein variations are indicated by dashed lines. It is noted that profiles such as those of FIGS. 8 and 10 present the fiber designer with fewer design variables than the profile of FIG. 5, for example. However, preliminary calculations indicate that these profiles can provide suitable two-mode/single-mode operation. Fibers of the type represented by FIG. 7, wherein the refractive index of the depressed index region 72 is lower than that of the cladding, are likely to exhibit low bending loss characteristics.

It is noted that many of the core profiles of FIGS. 5 through 10 have been considered previously in connection with optical fibers which operate exclusively in either the single-mode or the multimode region. However, none have been considered previously in connection with optical fibers which are so characterized that they are capable of simultaneously providing mode equalized two-mode operation and low dispersion single-mode operation.

Optical fibers having core index profiles designed in accordance with the present invention can be fabricated by conventional fiber fabrication processes including, but not limited to: (a) the inside CVD process exemplified by the process disclosed in U.S. Pat. No. 4,217,027, (b) the plasma CVD process exemplified by the process disclosed in the Journal of the Electrochemical Society: Solid State Science and Technology, vol. 125, No. 8, Aug. 1978, pages 1298–1302, and (c) the outside CVD process, an embodiment of which is discussed below.

Silica is employed as the base material for most commercially available optical fibers. Such fibers exhibit low attenuation in the following wavelength regions: 700 nm to 930 nm, 1270 nm to 1335 nm and 1350 nm to 1600 nm, these low attenuation regions being separated by regions of high attenuation caused by OH ions. Since the material dispersion versus wavelength curve passes through zero dispersion at a wavelength near 1280 nm for high silica content fibers, single-mode fibers can be designed which exhibit zero total dispersion at any wavelength above that wavelength. Various design parameters of the fiber are adjusted so that the waveguide dispersion balances out the material dispersion at some specified wavelength which is usually selected because of low fiber attenuation and/or availability of light sources. Single-mode silica-based optical fibers which operate in the wavelength range between 1270 nm and 1335 nm are referred to as dispersion nonshifted fibers when they exhibit zero total dispersion in that low attenuation region that is occupied by the zero material dispersion wavelength but exhibit higher dispersion at longer wavelengths. Techniques such as those disclosed in my aforementioned U.S. Pat. No. 4,715,679 can be employed to make dispersion shifted fibers wherein the zero total dispersion wavelength is greater than 1400 nm. That patent also describes a dispersion flattened fiber which exhibits low total dispersion over a wide band of wavelengths which includes the zero material dispersion wavelength. It is contemplated that the few mode/single-mode fiber of the present invention could be modified in accordance with the teachings of my aforementioned patent such that the resultant fiber would propagate a single-mode signal which exhibits (a) low total dispersion over a wide band of wavelengths which includes the zero material dispersion wavelength, or (b)(1) waveguide dispersion that is relatively uniform with respect to wavelength, and (b)(2) waveguide dispersion is relatively large at wavelengths greater than 1400 nm so that large values of material dispersion can be completely cancelled, whereby the fiber exhibits zero total dispersion at wavelengths greater than 1500 nm.

An optical fiber having a refractive index profile of the type illustrated in FIG. 1 was made as follows. In accordance with the above-described procedure, the fiber radii and refractive indices were determined. Radii a, $a_1$ and $a_2$ were determined to be about 5 $\mu$m, 1.9 $\mu$m and 3.5 $\mu$m, respectively. The relative refractive index differences $\Delta_1$ and $\Delta_2$ were determined to be about 0.45% and 0.12%, respectively. Pure $SiO_2$ was selected for the cladding material, and the core regions were formed of $SiO_2$ doped with $GeO_2$. In order to achieve the aforementioned $\Delta$ values, it was determined that the central core region of radius $a_1$ and the core segment between radii $a_2$ and a should consist of SiO doped with about 9 wt. % $GeO_2$ and the segment of depressed refractive index between radii $a_1$ and $a_2$ should consist of $SiO_2$ doped with about 2.5 wt. % $GeO_2$.

A particulate glass core preform was made by a process similar to those taught in U.S. Pat. Nos. 4,453,961 and 4,486,212, wherein a flame hydrolysis burner deposits glass particles on the surface of a cylindrically-shaped mandrel to form the core portion and the inner cladding region of the resultant fiber. The mandrel was removed from the particulate glass preform which was then dried, consolidated and stretched to reduce the diameter thereof. Additional $SiO_2$ was then deposited to form the remainder of the cladding. The resultant dense glass preform was drawn into a fiber. Because of diffusion which occurs during the drying, consolidating and drawing operations, the peaks and valleys of the refractive index profile of the fiber are rounded rather than step-shaped as shown in FIG. 1. Also, there is an index depression at the center line. The results of these diffusion processes manifest themselves to the greatest extent after the core preform has been consolidated. The refractive index profile of the core preform is therefore re-measured, and a step fitting equivalent to the measured profile is generated by computer to determine whether the preform refractive index profile sufficiently closely approximates the desired profile. If the effective refractive index value or radius of any region of the preform is not in accordance with the calculated specification, adjustments are made to various process parameters to bring the manufactured preform into closer agreement with the calculated specifications. The flow rates of the reactants flowing to the burner, the temperatures of the flame and deposited particles, and the process variables of the drying and consolidating processes are examples of conditions that can be changed to bring the equivalent step fitting of the next produced preform into closer conformity with the calculated specification.

A core preform was manufactured in accordance with the above-described process. The core and cladding diameters of the consolidated preform were 3.06 mm and 6.94 mm, respectively, and the ratios $a_1/a$ and $a_2/a$ were 0.373 and 0.686, respectively. The values of $\Delta_1$ and $\Delta_2$ were 0.4516 and 0.1231, respectively. The preform was stretched to eliminate the axial hole and to reduce the diameter thereof. The stretched preform was overclad with additional $SiO_2$, and drawn into an optical fiber.

Fibers produced in accordance with the above example have exhibited the following characteristics. The mode equalization is such that the measured 3 dB bandwidth is clearly greater than 2 GHz km at 850 nm and 900 nm, the extrapolated 3 dB bandwidth being between 2 and 4 GHz km over a wavelength range of about 100 nm. The fiber also exhibited the following single-mode attributes. The attenuation measured at 1.3 $\mu$m and 1.55 $\mu$m was about 0.35 dB/km and 0.20 dB/km, respectively. The zero dispersion wavelength was about 1312 nm. The mode field diameter, $2W_o$, was about 9.5 $\mu$m. The bend performance was found to be comparable to existing commercial step-index single-mode fibers. In the few moded region of operation, more than twice the power could be coupled into the fiber from a given source as compared with the amount of light that could be coupled from that source to a fiber designed to be single-mode at that wavelength.

I claim:

1. An optical fiber comprising
   a core of transparent material having a maximum refractive index $n_1$ and a radius a, and
   a layer of transparent cladding material on the outer surface of said core, the refractive index $n_0$ of said cladding being less than $n_1$,
   said fiber being characterized in that the refractive indices $n_1$ and $n_0$, the radius a, and the refractive index profile of the core are designed such that
   (a) $-\tau_j$, the difference between $|d(Vb)/dV|_j$, the normalized delay time of the jth mode and $|d(Vb)/dV|_0$, the normalized delay time of the fundamental mode, is less than about $5 \times 10^{-2}$ over a range of V-values equal to about 10% of V near $V^{j+1}_c$, where j is an integer up to 2 and represents the highest order mode that is capable of propagating through said fiber, 0 represents the fundamental mode, b is the propagation constant and V is the normalized frequency, and $V^{j+1}_c$ is the normalized cutoff frequency of the j+1 mode, and
   (b) the normalized waveguide dispersion $Vd^2(Vb)/dV^2$ is about equal to or less than 0.2 at V-values near $V^1_c$, the normalized cutoff frequency of the first higher order mode.

2. An optical fiber in accordance with claim 1 wherein said core comprises a plurality of radially disposed regions, the refractive index profile of at least one of said regions being radially graded.

3. An optical fiber in accordance with claim 1 wherein said core includes at least one annular region of depressed refractive index, the inner radius $a_i$ of the innermost of said at least one region being greater than zero and the maximum radius $a_0$ of the outermost of said at least one region of depressed refractive index being less than the radius a.

4. An optical fiber in accordance with claim 1 wherein said core includes a centrally located region having a maximum refractive index $n_1$ and a radius $a_1$ surrounded by at least two regions of increasing radius having the following refractive indices and radii: $(n_2, a_a)$ and $(n_3, a_3)$, respectively, wherein $a_3$ is greater than $a_2$, $a_2$ is greater than $a_1$, and $n_1$ and $n_3$ are greater than $n_2$.

5. An optical fiber in accordance with claim 4 wherein $n_1$ is greater than $n_3$.

6. An optical fiber in accordance with claim 4 wherein $n_3$ is greater than $n_1$.

7. An optical fiber in accordance with claim 4 wherein $n_2$ is greater than $n_0$.

8. An optical fiber in accordance with claim 4 wherein $n_2$ is less than $n_0$.

9. An optical fiber in accordance with claim 8 wherein said core comprises a further region having a radius $a_4$ which is greater than $a_3$ and a refractive index $n_4$ which is less than $n_0$.

10. An optical fiber in accordance with claim 9 wherein $n_4$ is equal to $n_2$.

11. An optical fiber in accordance with claim 1 wherein said core includes a centrally located region having a maximum refractive index $n_1$ and a radius $a_1$ surrounded by at least two regions of increasing radius having the following refractive indices and radii: $(n_2, a_2)$ and $(n_3, a_3)$, respectively, wherein $a_3$ is greater than $a_2$, $a_2$ is greater than $a_1$, and $n_2$ is greater than $n_1$ and $n_3$.

12. An optical fiber in accordance with claim 11 wherein $n_1$ is equal to $n_3$.

13. An optical fiber in accordance with claim 11 wherein $n_1$ is not equal to $n_3$.

14. An optical fiber in accordance with claim 1 wherein said core includes a centrally located region having a maximum refractive index $n_1$ and a radius $a_1$ surrounded by at least one region having a refractive index $n_2$ and radius $a_2$ and wherein $n_1$ is greater $n_0$ and $n_0$ is greater than $n_2$.

15. An optical fiber in accordance with claim 1 wherein said core includes a centrally located region having a maximum refractive index $n_1$ and a radius $a_1$ surrounded by a region having a refractive index $n_2$ and a radius $a_2$, and wherein $n_1$ is greater than $n_2$ and $n_2$ is greater than $n_0$.

16. An optical fiber in accordance with claim 15 wherein said core further comprises a third region having a refractive index less than $n_2$ and $n_0$ and having a radius greater than $a_2$.

17. An optical fiber in accordance with claim 1 wherein said fiber is characterized in that it comprises core refractive index means for enabling the propagation of a single mode signal with zero total dispersion near the zero material dispersion wavelength.

18. An optical fiber in accordance with claim 17 wherein said fiber is characterized in that said core and said layer of transparent cladding material each comprise silica or silica and a dopant which modifies the refractive index thereof, and wherein said fiber comprises refractive index means for enabling the propagation of a single mode signal with zero total dispersion at a wavelength within the range of about 1285–1335 nanometers.

19. An optical fiber comprising a core of transparent material having a maximum refractive index $n_1$ and a radius a, and a layer of transparent cladding material on the outer surface of said core, the refractive index $n_0$ of said cladding being less than $n_1$, said fiber being characterized in that the refractive indices $n_1$ and $n_0$, the radius a, and the refractive index profile of the core are designed such that (a) $-\tau_j$, the difference between $|d(V/b)/dV|_j$, the normalized delay time of the jth mode and $|d(Vb)/dV|_0$, the normalized delay time of the fundamental mode, is less than about $5 \times 10^{-2}$ over a range of V-values equal to about 10% of V near $V^{j+1}{}_c$, where j is an integer up to 2 and represents the highest order mode that propagates through said fiber, 0 represents the fundamental mode, b is the propagation constant and V is the normalized frequency, and $V^{j+1}{}_c$ is the normalized cutoff frequency of the $j+1$ mode, and (b) said fiber exhibits a single-mode dispersion of less than 5 ps/nm-km.

20. An optical fiber in accordance with claim 19 wherein said fiber is characterized in that the refractive indices $n_1$ and $n_0$, the radius a, and the refractive index profile of the core are designed such that said fiber is capable of propagating a single mode signal with zero total dispersion near the zero material dispersion wavelength.

21. An optical fiber in accordance with claim 20 wherein said fiber is characterized in that said core and said layer of transparent cladding material each comprise silica or silica and a dopant which modifies the refractive index thereof, and wherein the refractive indices $n_1$ and $n_0$, the radius a, and the refractive index profile of the core are designed such that said fiber is capable of propagating a single mode signal with zero total dispersion at a wavelength within the range of about 1285–1335 nanometers.

22. An optical fiber in accordance with claim 19 wherein said core comprises a plurality of radially disposed regions, the refractive index profile of at least one of said regions being radially graded.

23. An optical fiber in accordance with claim 19 wherein said core includes at least one annular region of depressed refractive index, the inner radius $a_i$ of the innermost of said at least one region being greater than zero and the maximum radius $a_0$ of the outermost of said at least one region of depressed refractive index being less than the radius a.

24. An optical fiber in accordance with claim 19 wherein said core includes a centrally located region having a maximum refractive index $n_1$ and a radius $a_1$ surrounded by at least two regions of increasing radius having the following refractive indices and radii: $(n_2, a_2)$ and $(n_3, a_3)$ respectively, wherein $a_3$ is greater than $a_2$, $a_2$ is greater than $a_1$, and $n_1$ and $n_3$ are greater than $n_2$.

25. An optical fiber in accordance with claim 19 wherein said core includes a centrally located region having a maximum refractive index $n_1$ and a radius $a_1$ surrounded by at least two regions of increasing radius having the following refractive indices and radii: $(n_2, a_2)$ and $(n_3, a_3)$, respectively, wherein $a_3$ is greater than $a_2$, $a_2$ is greater than $a_1$, and $n_2$ is greater than $n_1$ and $n_3$.

26. An optical fiber in accordance with claim 19 wherein said core includes a centrally located region having a maximum refractive index $n_1$ and a radius $a_1$ surrounded by at least one region having a refractive index $n_2$ and radius $a_2$ and wherein $n_1$ is greater than $n_0$ and $n_0$ is greater than $n_2$.

27. An optical fiber in accordance with claim 19 wherein said core includes a centrally located region having a maximum refractive index $n_1$ and a radius $a_1$ surrounded by a region having a refractive index $n_2$ and a radius $a_2$, and wherein $n_1$ is greater than $n_2$ and $n_2$ is greater than $n_0$.

28. An optical fiber comprising
   a core of transparent material having a maximum refractive index $n_1$ and a radius a, and
   a layer of transparent cladding material on the outer surface of said core, the refractive index $n_0$ of said cladding being less than $n_1$,
said fiber being characterized in that the refractive indices $n_1$ and $n_0$, the radius a, and the refractive index profile of the core are designed such that
   (a) said fiber is capable of propagating two or more modes at a first wavelength range with a bandwidth greater than 1 GHz-km, and
   (b) the normalized waveguide dispersion $Vd^2(Vb)/dV^2$ is about equal to or less than 0.2 at V-values near $V^1{}_c$, the normalized cutoff frequency of the first higher order mode.

29. An optical fiber in accordance with claim 28 wherein said fiber is characterized in that the refractive indices $n_1$ and $n_0$, the radius a, and the refractive index profile of the core are designed such that said fiber is capable of propagating a single mode signal with zero total dispersion near the zero material dispersion wavelength.

30. An optical fiber in accordance with claim 29 wherein said fiber is characterized in that said core and said layer of transparent cladding material each comprise silica and a dopant which modifies the refractive index thereof, and wherein the refractive indices $n_1$ and $n_0$, the radius a, and the refractive index profile of the core are designed such that said fiber is capable of propagating a single mode signal with zero total dispersion at a wavelength within the range of about 1285–1335 nanometers.

31. An optical fiber in accordance with claim 28 wherein $\Delta\tau_j$ is less than about $5\times 10^{-2}$ over a range of V-values equal to about 10% of V near $V^{j+1}{}_c$, where $V^{j+1}{}_c$ is the normalized cutoff frequency of the $j+1$ mode.

32. An optical fiber in accordance with claim 28 wherein said core comprises a plurality of radially disposed regions, the refractive index profile of at least one of said regions being radially graded.

33. An optical fiber in accordance with claim 28 wherein said core includes at least one annular region of depressed refractive index, the inner radius $a_i$ of the innermost of said at least one region being greater than zero and the maximum radius $a_0$ of the outermost of said at least one region of depressed refractive index being less than the radius a.

34. An optical fiber in accordance with claim 28 wherein said core includes a centrally located region having a maximum refractive index $n_1$ and a radius $a_1$ surrounded by at least two regions of increasing radius having the following refractive indices and radii: $(n_2, a_2)$ and $(n_3, a_3)$, respectively, wherein $a_3$ is greater than $a_2$, $a_2$ is greater than $a_1$, and $n_1$ and $n_3$ are greater than $n_2$.

35. An optical fiber in accordance with claim 28 wherein said core includes a centrally located region having a maximum refractive index $n_1$ and a radius $a_1$ surrounded by at least two regions of increasing radius having the following refractive indices and radii: $(n_2, a_2)$ and $(n_3, a_3)$, respectively, wherein $a_3$ is greater than $a_2$, $a_2$ is greater than $a_1$, and $n_2$ is greater than $n_1$ and $n_3$.

36. An optical fiber in accordance with claim 28 wherein said core includes a centrally located region having a maximum refractive index $n_1$ and a radius $a_1$ surrounded by at least one region having a refractive index $n_2$ and radius $a_2$ and wherein $n_1$ is greater than $n_0$ and $n_0$ is greater than $n_2$.

37. An optical fiber in accordance with claim 28 wherein said core includes a centrally located region having a maximum refractive index $n_1$ and a radius $a_1$ surrounded by a region having a refractive index $n_2$ and a radius $a_2$, and wherein $n_1$ is greater than $n_2$ and $n_2$ is greater than $n_0$.

38. An optical fiber comprising
   a core of transparent material having a maximum refractive index $n_1$ and a radius a, and
   a layer of transparent cladding material on the outer surface of said core, the refractive index $n_0$ of said cladding being less than $n_1$,
said fiber being characterized in that it comprises core refractive index means for enabling the propagation of
   (a) a signal having two or more modes in the wavelength range between about 800 and 900 nanometers with a bandwidth greater than 1 GHz, and
   (b) a single-mode signal with a dispersion of less than 5 ps/nm-km at a wavelength greater than 1250 nanometers.

39. An optical fiber in accordance with claim 38 wherein said fiber is characterized in that the refractive indices $n_1$ and $n_0$, the radius a, and the refractive index profile of the core are designed such that said fiber is capable of propagating a single mode signal with zero total dispersion near the zero material dispersion wavelength.

40. An optical fiber in accordance with claim 39 wherein said fiber is characterized in that said core and said layer of transparent cladding material each comprise silica or silica and a dopant which modifies the refractive index thereof, and wherein the refractive indices $n_1$ and $n_0$, the radius a, and the refractive index profile of the core are designed such that said fiber is capable of propagating a single mode signal with zero total dispersion at a wavelength within the range of about 1285–1335 nanometers.

41. An optical fiber comprising
   a core of transparent material having a maximum refractive index $n_1$ and a radius a, and
   a layer of transparent cladding material on the outer surface of said core, the refractive index $n_0$ of said cladding being less than $n_1$,
said fiber being characterized in that the refractive indices $n_1$ and $n_0$, the radius a, and the refractive index profile of the core are designed such that
   (a) said fiber operates at a V-value $V_o$ that is up to 1.1 $V^{j+1}{}_c$, and $\_\tau_j$, the difference between $|d(Vb)/dV|_j$, the normalized delay time of the jth mode and $|d(Vb)/dV|_0$, the normalized delay time of the fundamental mode, is less than about $5\times 10^{-2}$ over a range of V-values equal to about 10% of V near $V^{j+1}{}_c$, where 0 represents the fundamental mode, j is an integer up to 2 and represents the jth higher order mode which propagates through said fiber, b is the propagation constant, V is the normalized frequency, and $V^{j+1}{}_c$ is the normalized cutoff frequency of the $j+1$ mode, and (b) the normalized waveguide dispersion $V d^2(Vb)/dV^2$ is about equal to or less than 0.2 at V-values near $V^1{}_c$, the normalized cutoff frequency of the first higher order mode.

42. An optical fiber comprising a core of transparent material having a maximum refractive index $n_1$ and a radius a, and a layer of transparent cladding material on the outer surface of said core, the refractive index $n_0$ of said cladding being less than $n_1$, said fiber being characterized in that the refractive indices $n_1$ and $n_0$, the radius a, and the refractive index profile of the core are designed such that (a) said fiber operates at a V-value $V_o$ that is up to 1.1 $V^2{}_c$, the normalized cutoff frequency of the second higher order mode, $\_\tau_j$, the difference between $|d(Vb)/dV|_1$, the normalized delay time of the first higher order mode and $|d(Vb)/dV|_0$, the normalized delay time of the fundamental mode, is less than about $5 \times 10^{-2}$ over a range of V-values equal to about 10% of V near $V^2{}_c$, where b is the propagation constant and V is the normalized frequency, and (b) the normalized waveguide dispersion $V d^2(Vb)/dV^2$ is about equal to or less than 0.2 at V-values near $V^1{}_c$, the normalized cutoff frequency of the first higher order mode.

43. An optical fiber in accordance with claim 42 wherein said fiber operates at a V-value $V_o$ that is no greater than 1.0 $V^2{}_c$.

44. An optical fiber comprising a core of transparent material having a maximum refractive index $n_1$ and a radius a, and a layer of transparent cladding material on the outer surface of said core, the refractive index $n_0$ of said cladding being less than $n_1$, said fiber being characterized in that the refractive indices $n_1$ and $n_0$, the radius a, and the refractive index profile of the core are designed such that (a) said fiber operates at a V-value $V_o$ that is up to 1.1 $V^3{}_c$, the normalized cutoff frequency of the third higher order mode, $\_\tau_j$, the difference between $|d(Vb)/dV|_2$, the normalized delay time of the second higher order mode and $|d(Vb)/dV|_0$, the normalized delay time of the fundamental mode, is less than about $5 \times 10^{-2}$ over a range of V-values equal to about 10% of V near $V^3{}_c$, where b is the propagation constant and V is the normalized frequency, and (b) the normalized waveguide dispersion $V d^2(Vb)/dV^2$ is about equal to or less than 0.2 at V-values near $V^1{}_c$, the normalized cutoff frequency of the first higher order mode.

45. An optical fiber in accordance with claim 44 wherein said fiber operates at a V-value $V_o$ that is no greater than 1.0 $V^3{}_c$.

* * * * *